United States Patent
Simon et al.

(10) Patent No.: US 11,079,061 B1
(45) Date of Patent: Aug. 3, 2021

(54) GRAVITY ACTUATED CLAMP

(71) Applicant: Russ Bassett Corporation, Whitter, CA (US)

(72) Inventors: Trevor Simon, Lake Forest, CA (US); Sasha Johnson, Fullerton, CA (US)

( * ) Notice: Subject to any disclaimer, the term of this patent is extended or adjusted under 35 U.S.C. 154(b) by 209 days.

(21) Appl. No.: 16/018,788

(22) Filed: Jun. 26, 2018

Related U.S. Application Data (60) Provisional application No. 62/572,998, filed on Oct. 16, 2017, provisional application No. 62/525,728, filed on Jun. 27, 2017.

(51) Int. Cl.
| | | |
|---|---|---|
| *F16M 13/02* | (2006.01) | |
| *F16M 11/10* | (2006.01) | |
| *A47F 5/08* | (2006.01) | |

(52) U.S. Cl.
CPC ........... *F16M 11/10* (2013.01); *A47F 5/0853* (2013.01); *F16M 13/02* (2013.01)

(58) Field of Classification Search
CPC ...... F16M 11/10; F16M 13/02; F16M 13/022; A47F 5/0853
USPC ............. 248/307, 225.21, 690, 316.4, 316.1, 248/337.1, 223.41, 689, 231.31, 224.51, 248/224.61, 225.11, 229.11, 229.12
See application file for complete search history.

(56) References Cited

U.S. PATENT DOCUMENTS

| | | | | |
|---|---|---|---|---|
| 935,730 A | * | 10/1909 | Bacon ................... | F16M 11/24 248/207 |
| 1,024,386 A | * | 4/1912 | Yochem .............. | B60R 11/0241 248/316.4 |
| 3,902,932 A | * | 9/1975 | Gdanski ............... | A47K 10/185 248/313 |
| 4,678,151 A | * | 7/1987 | Radek ................... | A47F 5/0846 211/59.1 |
| 5,370,570 A | * | 12/1994 | Harris .................. | A63H 33/006 24/486 |
| 5,381,992 A | * | 1/1995 | Lohausen .......... | E04F 10/0618 160/903 |
| 5,833,189 A | * | 11/1998 | Rossman ............... | A47G 19/10 248/231.61 |
| 6,032,939 A | * | 3/2000 | Chen ...................... | B25B 1/103 269/249 |
| 6,375,140 B1 | * | 4/2002 | Shen ....................... | A47H 1/14 160/181 |
| 7,066,435 B2 | | 6/2006 | Oddsen, Jr. et al. | |
| 7,591,385 B2 | | 9/2009 | Brooks | |
| 7,597,500 B2 | | 10/2009 | Gernez | |
| 7,988,117 B2 | * | 8/2011 | Blanchard ............ | A47K 10/185 248/316.4 |
| 8,267,363 B2 | | 9/2012 | Begic et al. | |

(Continued)

FOREIGN PATENT DOCUMENTS

| | | | | |
|---|---|---|---|---|
| DE | 9204550 U1 | * | 6/1992 | ........... F16M 13/022 |
| WO | WO-0229259 A1 | * | 4/2002 | ................ F16B 2/12 |
| WO | WO-2008012368 A1 | * | 1/2008 | ........... F16M 13/022 |

*Primary Examiner* — Kimberly T Wood
(74) *Attorney, Agent, or Firm* — The Law Office Of Austin Bonderer, PC; Austin Bonderer (57) ABSTRACT

A clamp that can be used with slatwalls is described. The clamp has a cover and a clamping member. The cover has one or more positioners. The clamping member has outer lips, and it defines one or more holes and one or more grooves. The cover is coupled to the clamping member, and the one or more grooves are sized such that one of the one or more positioners can fit.

15 Claims, 10 Drawing Sheets

(56) References Cited

U.S. PATENT DOCUMENTS

| | | | |
|---|---|---|---|
| 8,282,058 B2 | 10/2012 | Lundrigan et al. | |
| 8,327,589 B2 | 12/2012 | Sutton et al. | |
| 8,366,067 B2 | 2/2013 | Felton | |
| 8,393,585 B2 | 3/2013 | Han et al. | |
| 8,474,193 B2 | 7/2013 | Sutton et al. | |
| 8,485,509 B2 * | 7/2013 | Wang | B25J 15/00 269/249 |
| 8,490,933 B2 | 7/2013 | Papic et al. | |
| 8,505,860 B2 * | 8/2013 | Schluter | F16M 11/045 248/125.1 |
| 8,926,029 B2 | 1/2015 | Han et al. | |
| 9,345,327 B2 | 5/2016 | Pierce et al. | |
| 9,498,107 B2 | 11/2016 | Doyle et al. | |
| 9,668,576 B2 | 6/2017 | Trunkle | |
| 10,531,733 B1 * | 1/2020 | Ho | F16M 13/022 |
| 2007/0221594 A1 | 9/2007 | Pierro | |
| 2010/0108837 A1 * | 5/2010 | Felton | A47B 96/067 248/221.11 |
| 2010/0327134 A1 * | 12/2010 | Lundrigan | F16M 11/046 248/220.31 |
| 2011/0315840 A1 * | 12/2011 | Connolly | F16M 11/041 248/220.31 |
| 2013/0075564 A1 * | 3/2013 | Ho | F16B 2/12 248/316.4 |
| 2013/0206944 A1 * | 8/2013 | Merck | F16M 13/02 248/309.1 |
| 2015/0060619 A1 | 3/2015 | Krannich et al. | |
| 2016/0018054 A1 * | 1/2016 | Simon | F16M 11/10 248/222.11 |
| 2016/0348835 A1 * | 12/2016 | Blalock | F16M 13/022 |
| 2017/0135483 A1 | 5/2017 | Cattaneo | |

\* cited by examiner

GRAVITY ACTUATED CLAMP

BACKGROUND

The present invention relates to display mounts and in particular to an improved load bearing slatwall equipment hanger for display or equipment mounts.

In some control center environments, visual access to displays is critical in performing vital functions. Display mounts must provide adjustment for the best viewing positions to minimize fatigue. Known monitor mounts include stacked pivoting arms which provide movement in literally any direction. As these mounts are extended there becomes significant leverage on the mounting device and the slatwall.

Monitor arms and other equipment mounts can have a significant cantilever load that is directly supported by the slatwall. If the slatwall engagement is achieved in a way that pre-stresses the slatwall slats, then the full strength of the slat is not available to support the equipment. Another important point is that some slatwall clamps that pinch vertically do not make solid contact with the face of the slatwall.

Further, display mounts are often mounted to a slatwall and are attached to the slatwall using equipment clamps. Such slatwalls comprises a multiplicity of vertically spaced apart parallel horizontal slats (e.g., "T" shaped features). The slatwall clamps may include either an offset which hooks in and up or a "J" that hooks in and down. The slatwall provides an easily reconfigurable mounting system with simple addition, removal, and adjustment of clamps.

Some equipment requires clamping the clamps to the slatwall to fix the hanger position preventing the easy movement of the clamps. Known slatwall clamps reach above a higher slat and below a lower slat, and are drawn together to clamp the hanger to the slatwall. While this provides an efficient method of securing the hanger because the vertically opposed clamps are drawn together, the amount of vertical force exerted on the slats may be excessive, causing stress on a horizontal portion of the slat, and sometimes breaking the slat even before any load is applied by the hanger.

With weighty loads and long lever arms, the stress on the slat can be excessive. This situation coupled with the stress from the opposing clamps makes the slat the weak link in the assembly.

Because installations may require a significant number of clamps and clips to be attached to the slatwall, the horizontal portion of the slats cannot be made thicker. Therefore, a need exists for a hanger which reduces that stress on a standard slatwall structure.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to better illustrate details and features. The description is not to be considered as limiting the scope of the embodiments described herein. It should be noted that references to "an" or "one" embodiment in this disclosure are not necessarily to the same embodiment, and such references mean at least one.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "electrically coupled" is defined as being in structural, electrical contact, whether directly or indirectly through intervening components, to allow the flow of electrons between the respective elements. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 1:
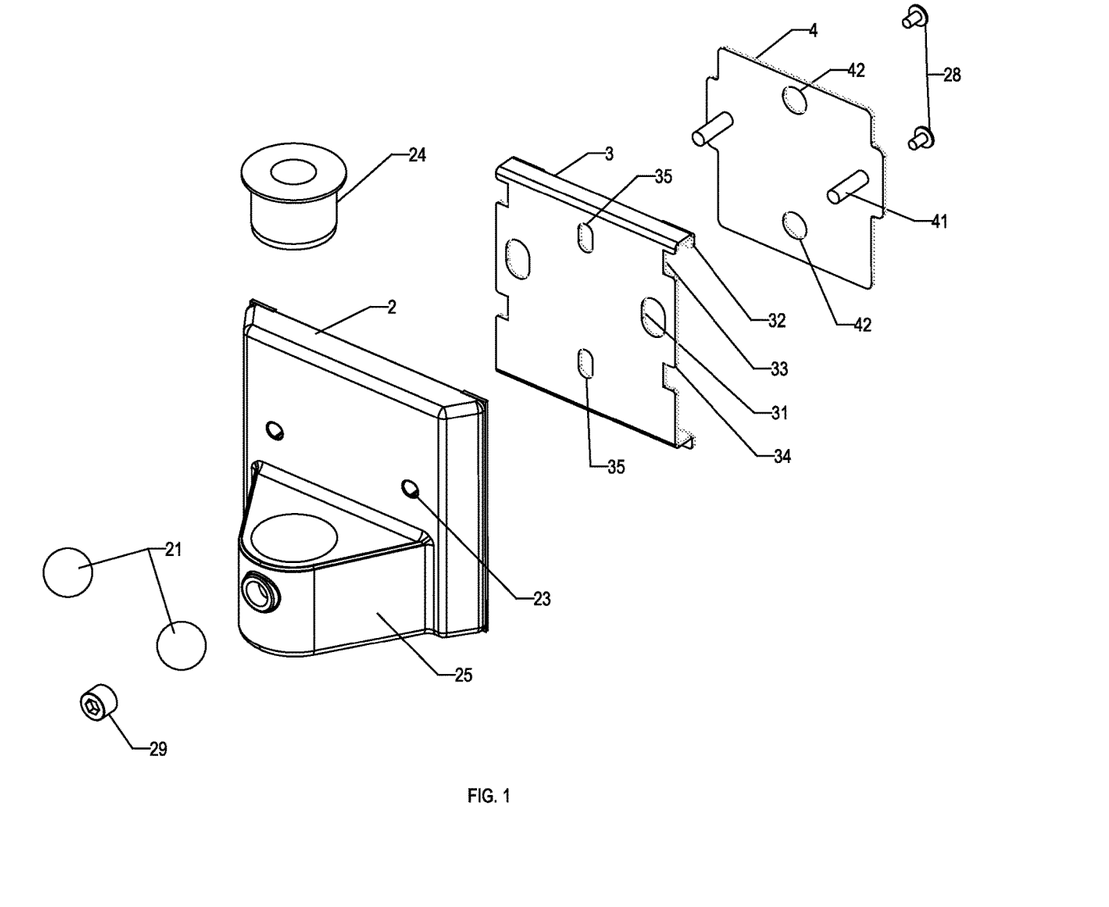
FIG. 1 is a front exploded view of an embodiment of a clamp.
Figure 2:
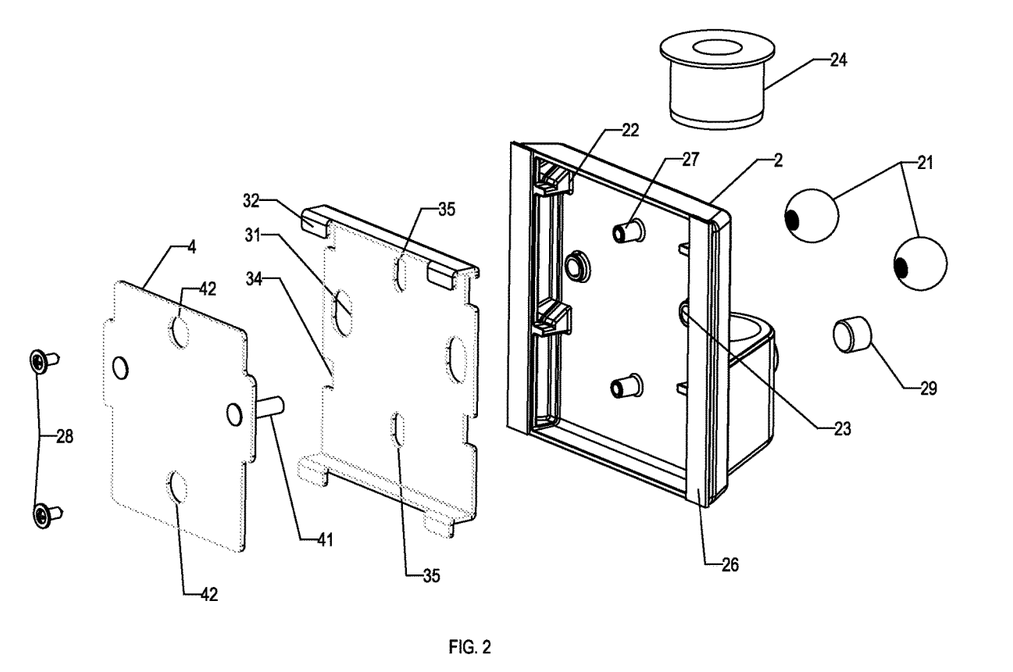
FIG. 2 is a rear exploded view of an embodiment of a clamp.
Figure 3:
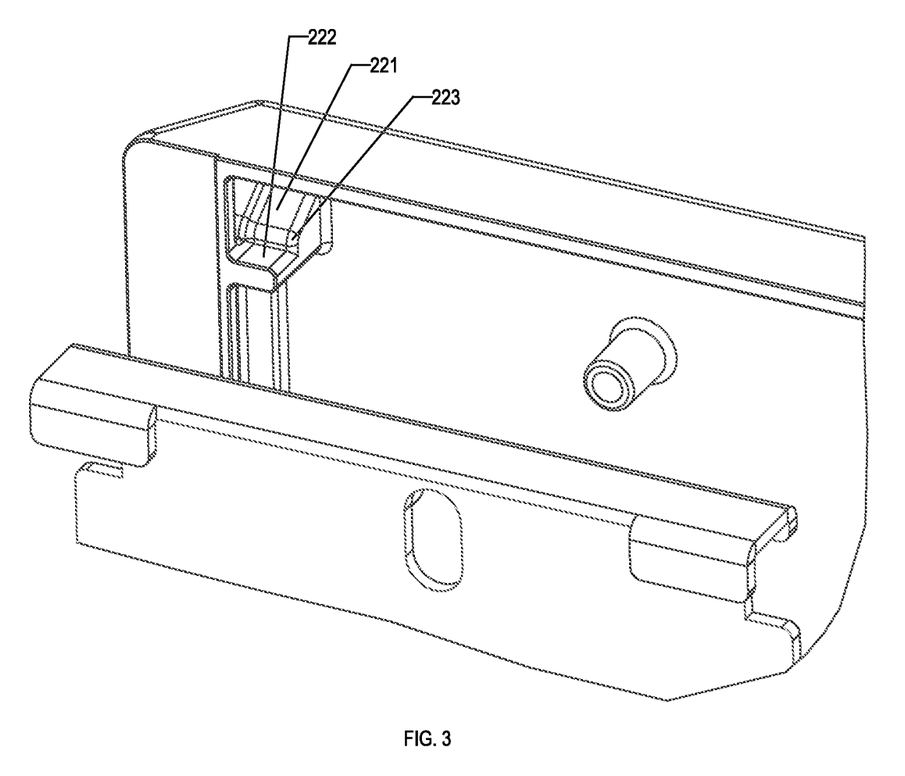
FIG. 3 is a close-up view of an embodiment of a positioner.

FIGS. 1 and 2 illustrate an exploded view of an embodiment comprising a cover 2, a clamping member 3, and a securing member 4. A cover 2, clamping member 3, and a securing member 4 of the clamp 1 is shown. A front view of the clamp 1 is shown in FIG. 1, and a rear view of the clamp 1 is shown in FIG. 2. The clamping member 3 is in sliding engagement with cover 2. The securing member 4 is coupled to the cover 2. The clamping member 3 defines one or more clamping member holes 31. In some embodiments, the clamping member holes 31 allow for vertical movement of the clamping member 3 with respect to the cover 2 and the securing member 4.

The cover 2 comprises one or more through holes 23 that the threaded members 41 slide therethrough. The threaded members 41 are secured by the nut 21. In some embodiment, the nut 21 comprises a handle (e.g., sphere, knob) to allow for easy rotation of the nut 21. The cover 2 further comprises a positioner 22. The positioner 22 comprises a slanted portion 221 and a landing 222.

The clamping member 3 comprises one or more outer lips 32. In some embodiments, the outer lips 32 come in pairs. In some embodiments, the pairs of outer lips 32 extend in the same direction, but in some other embodiments, the pairs of outer lips 32 extend in opposite directions. The clamping member 3 also defines one or more clamping member holes 31 through which the threaded member 41 extends. The interaction between the one or more holes 23 and the one or more threaded members 41 allows the clamping member 3 to move vertically.

The securing member 4 comprises one or more threaded members 41. The threaded members 41 can be integral with the securing member 4. In some embodiments, the threaded member 41 is a screw or bolt, and the nut 21 has a corresponding thread to the threaded member 41. It is also understood that in some embodiments a threaded element extends through the cover 2 and the securing member 4 comprises the nut 21. The clamping member 3 comprises one or more grooves 33 that interact with the positioner 22.

Figure 4:
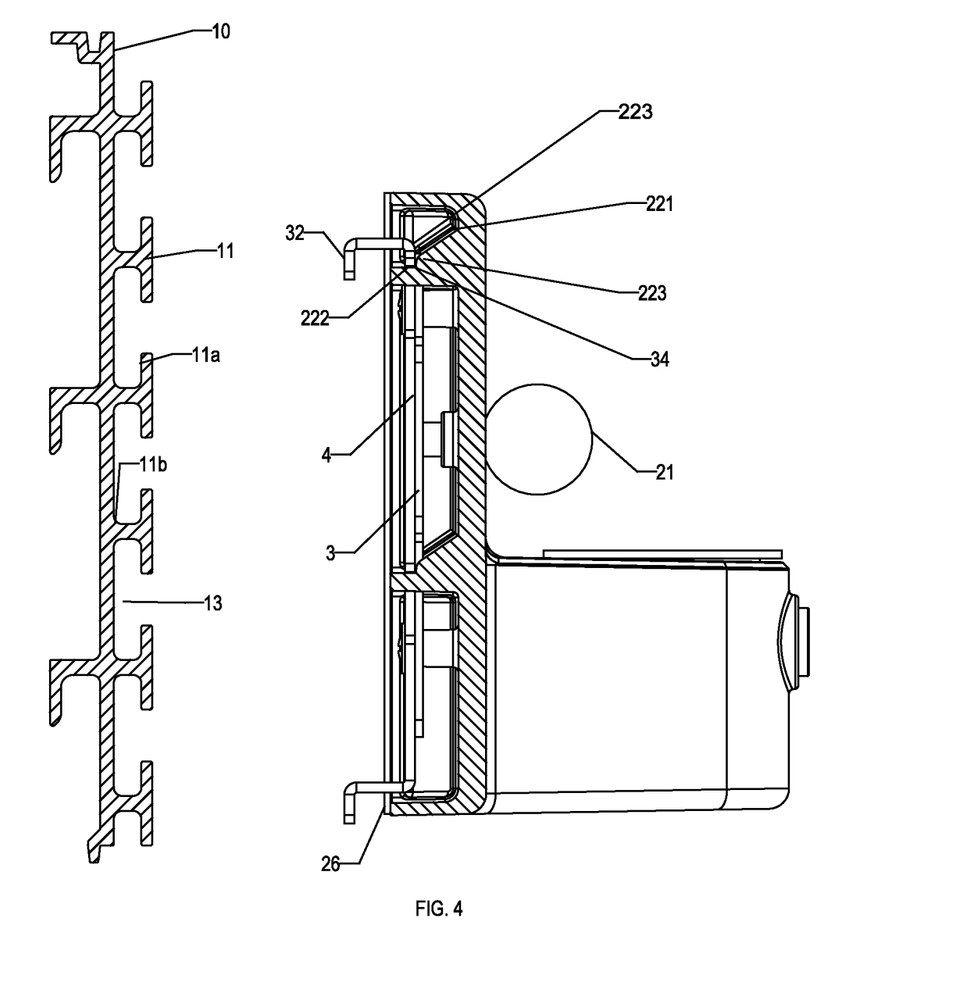
FIG. 4 shows an embodiment in an attachment position.
Figure 5:
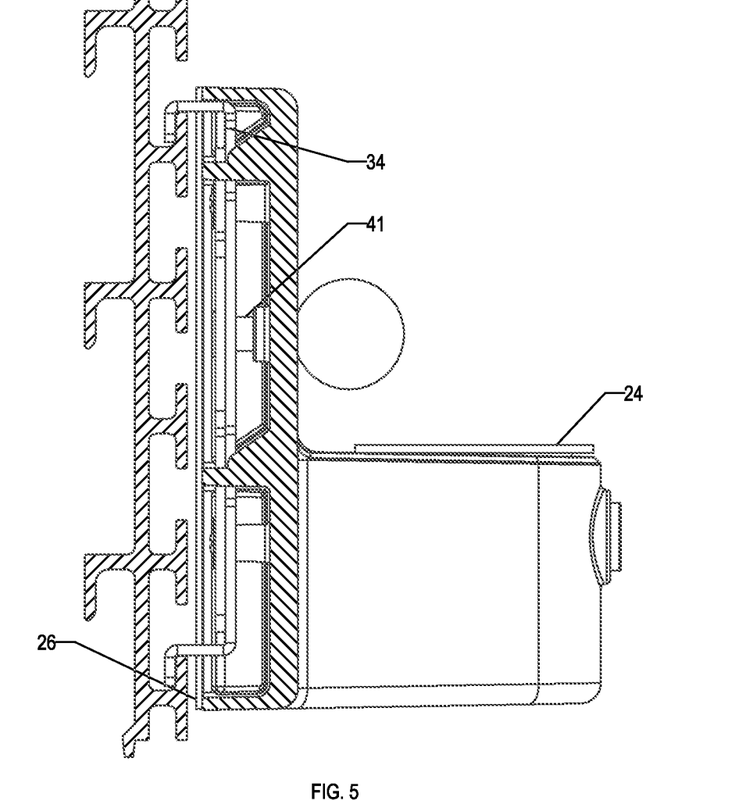
FIG. 5 shows an embodiment in a secured position.
Figure 6:
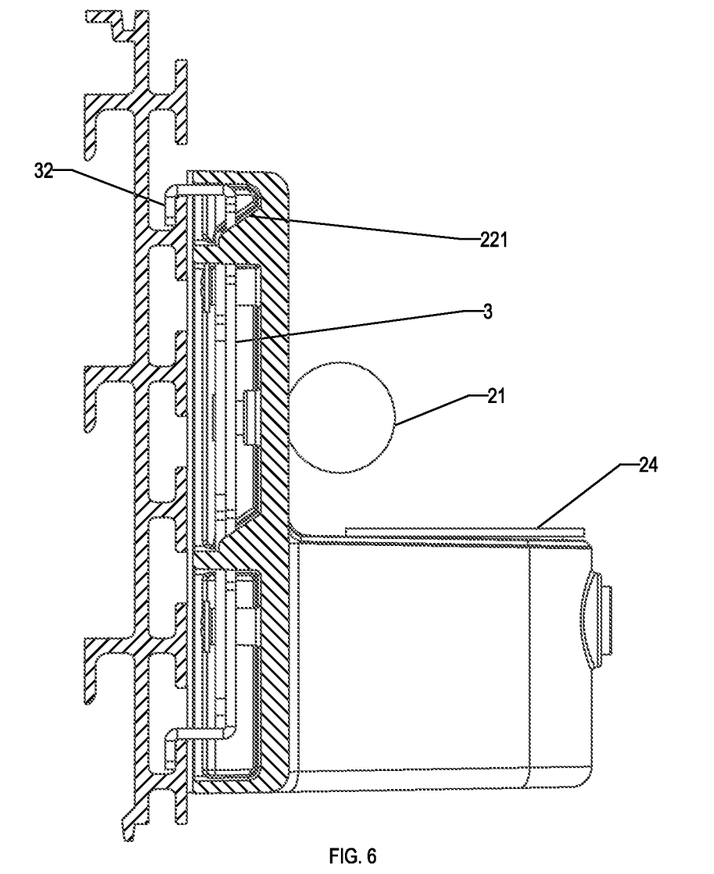
FIG. 6 shows an embodiment secured to a slatwall.

As can be seen in FIGS. 4-6, the clamp 1 is operated with the assistance of gravity in both an attachment position (as seen in FIG. 4) and a secured position (as seen in FIGS. 5 and 6). Initially, the one or more threaded members 41 are coupled to the nut 21, however not so much that the securing plate is fully pressed against the rest of the clamp 1. When a user picks up the clamp 1 by the cover 2, gravity will put the clamp 1 in the attachment position. While picking up the clamp 1, the ledge 34 will engage the slanted portion 221, slide along the slanted portion 221, the clamping member 3 will undergo both vertical and horizontal movement, and the ledge 34 will rest on the landing 222 (as seen in FIG. 4). The horizontal movement will provide better access for the outer lips 32 to engage the slatwall 10. In some embodiments, the positioner 22 will further comprise an abutment 223 that will serve as a backstop for the clamping member 3 when it is being placed on the slatwall 10. The abutment 223 will provide a counter force and help prevent the clamping member 3 from riding back up the slanted portion 221. Once the outer lips 32 are inserted into the respective open spaces 13, the user will allow the clamp 1 to rest on slatwall 10. Once the support for the cover 2 is removed, the cover 2 will slide down in relation to the clamping member 3 that is hanging on the slatwall 10 (as seen in FIG. 5). This will place the one or more grooves 33 above the positioner 22, such that when the user tightens the nut 21, the securing member 4 and the cover 2 will sandwich the clamping member 3 such that the positioner 22 will fit in the groove 33. The outer lip 32 and the inner lip 26, when present, will abut one or more vertical faces 11a (as seen in FIG. 6).

To release the clamp 1, the nut 21 is loosened to the point that the clamping member 3 free to move in relation to the slatwall 10.

Figure 7:
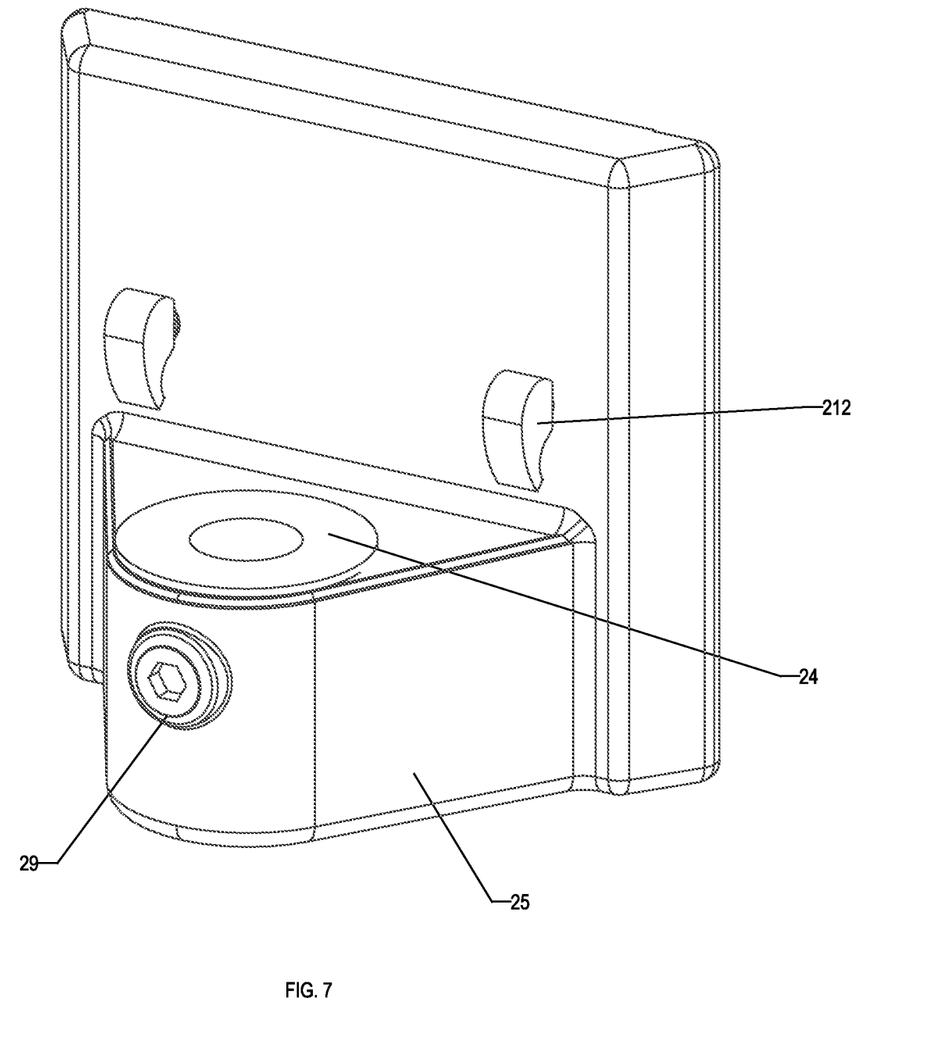
FIG. 7 shows an embodiment of a fastener type.

FIG. 7 shows an embodiment of a cover 2 comprising one or more cams 212. The cams 212 will engage the retaining members 28, in some embodiments the engagement will be threaded. When the engagement applies some pressure to the cover 2, the cam 212 will be rotated. The rotation of the cam 212 will push the cover 2 toward the securing member 4, increasing the force between the cover 2, the clamping member 3, and securing member 4.

A post insert 24 is also seen that is used to help position a post 5. The post insert 24 is located inside the device attachment 25 and outside the post 5. A tightening screw 29 is present that is used to help apply force between the post 5 and the cover 2 to help secure the two in relation to each other.

Figure 8:
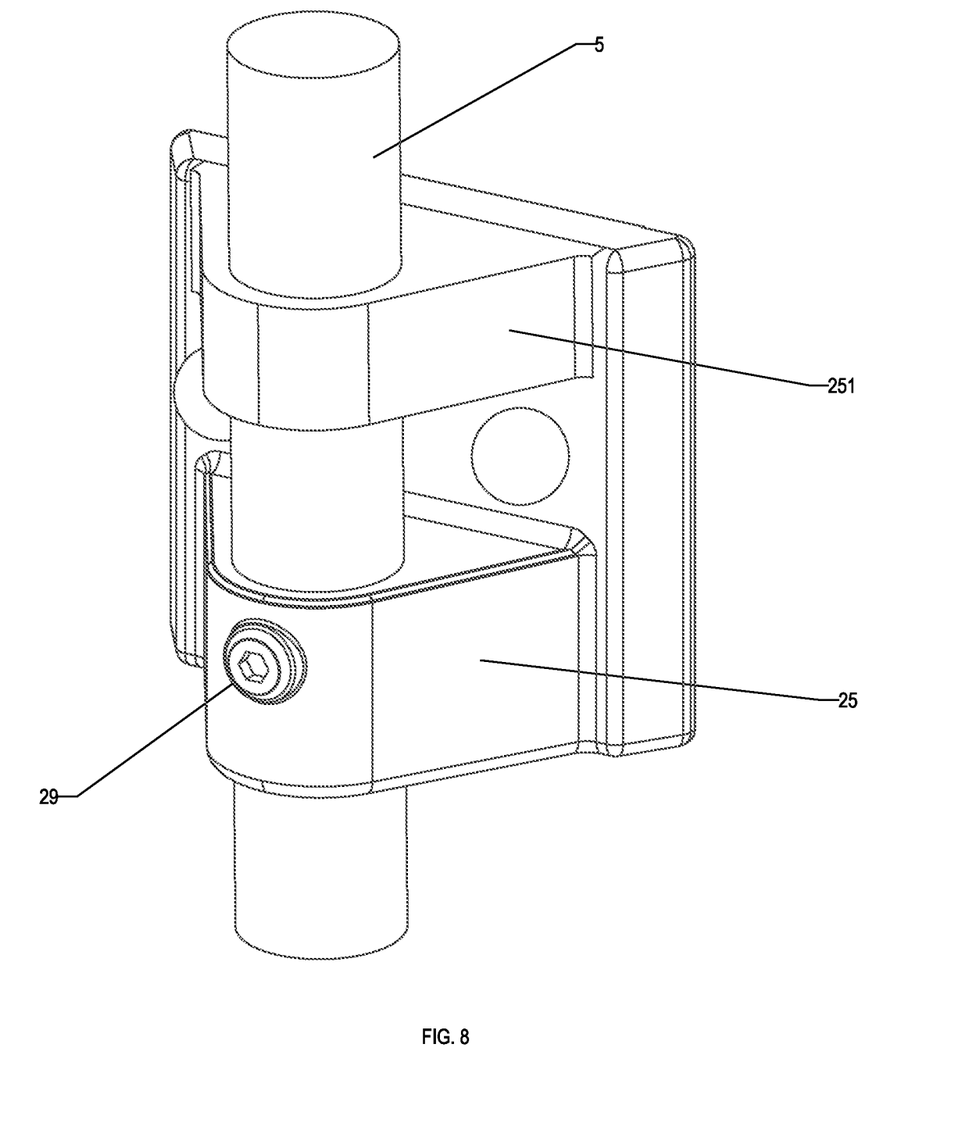
FIG. 8 shows an embodiment of a cover.

FIG. 8 shows an embodiment of the cover 2 comprising an additional device attachment 25. In many embodiments, the device attachments 25 and 251 are post 5 mounts. Additional device attachments 25 can provide more stability. The space between the device attachments 25 and 251 can be used to secure other items to the post 5. In other embodiments, the other items may or may not use the device attachments 25 and 251 for support.

Figure 9:
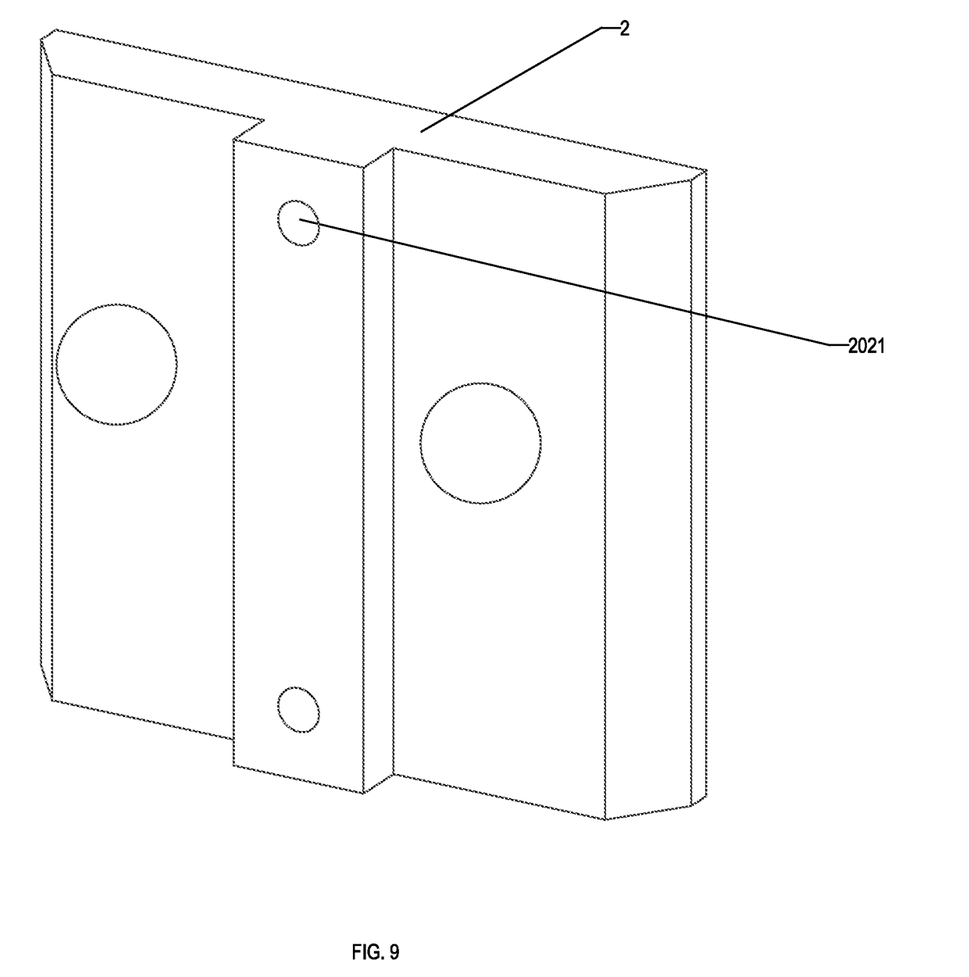
FIG. 9 shows an embodiment of a cover.

FIG. 9 shows an embodiment of a cover 2 comprising mounting holes 2021 that will allow for items to be mounted to the mounting holes 2021. In some embodiments, the mounting holes 2021 are threaded to allow threaded elements to be secured to the cover 2. In such embodiments, a threaded member 41 will engage the mounting holes 2021.

Figure 10:
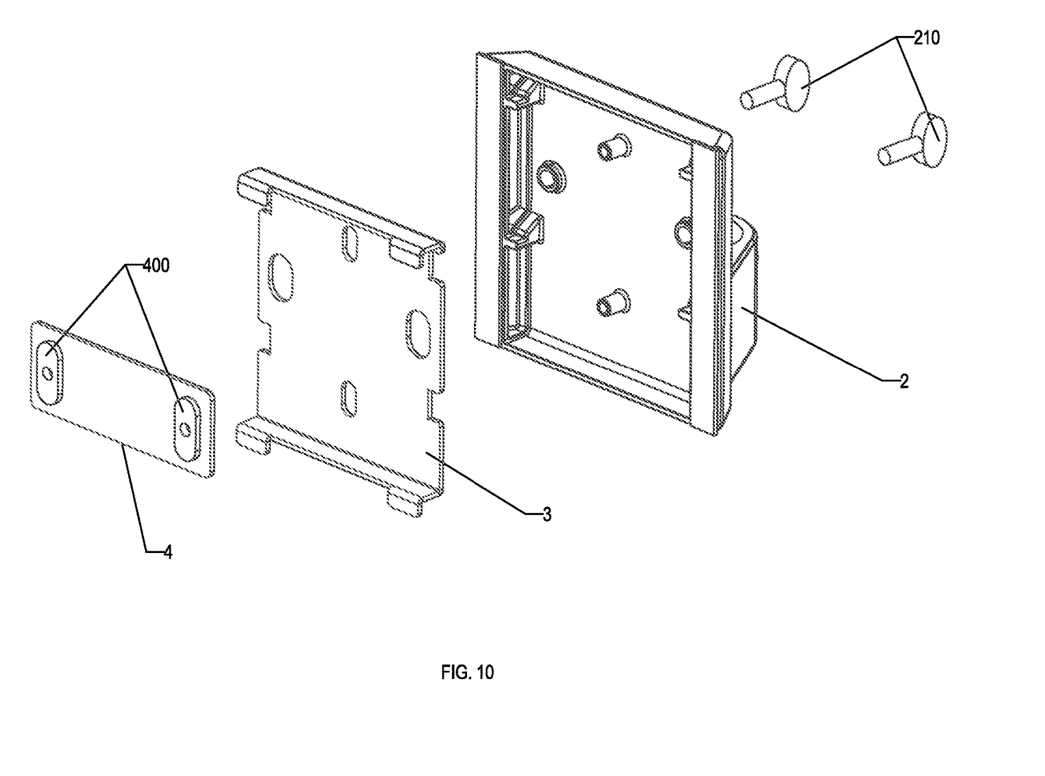
FIG. 10 shows an exploded view of an embodiment of a clamp.

FIG. 10 shows an embodiment of the clamp 1 comprising a securing member 4 comprises nuts 400 and threaded members 210. In some embodiments, the nuts 400 comprise weld nuts 400 and/or clinch nuts 400. The threaded members 210 will extend through the cover 2 and the clamping member 3 to engage the securing member 4 via the nuts 400.

In some embodiments, the outer lip 32 will substantially extend from one side of the clamping member 3 to the other.

In some embodiments, the cover 2 further comprises retaining members 28. The retaining members 28 can be threaded and coupled to retaining holes 27. The retaining members 28 extend through the securing member holes 42 and the clamping member holes 35 to engage the retaining holes 27. The retaining members 28 will retain the clamping member 3 even if the threaded member 41 is not coupled to cover 2.

In some embodiments, the cover 2 will comprise a device attachment 25.

It is also understood that U.S. Pat. No. 9,366,275, filed on Sep. 29, 2015, entitled slatwall 10 clamp 1 is hereby incorporated by reference.

The slatwall 10 can include a multiplicity of parallel vertically spaced apart slats 11. Each slat 11 includes a vertical face 11a and a horizontal standoff 11b. Open spaces 13 between consecutive slats 11 allow attachment of the clamp 1 to the slatwall 10. The clamp includes inner and outer lips 26 and 32 respectively which sandwich the vertical faces 11a of the slats 11 to attach the clamp to the slatwall 10. Such attachment reduces or eliminates vertical clamping forces on the slats 11, which when combined with the weight of accessories attached to the clamp 1, may damage the slats 11.

By horizontally clamping to the slatwall 10, there is pre-stress applied to the slat 11, and it ensures that the cover 2 is plumb, if the slatwall 10 is plumb. This reduces sagging in the monitor arm or equipment mount. U.S. Pat. No. 9,366,275 utilizes a spring feature to aid in the installation of the clamp 1 assembly. The spring can be relatively costly and difficult to overcome with a tool-less knob fastener. Replacing that spring with a slanted portion 221 and a landing 222 reduces cost and also allows the use of a simple ball knob to tighten the clamp 1 because a user no longer has to overcome the force of the spring. The spring can also consume much space on the back of the mechanism, which mandates a certain minimum clamp size and feature placement. The slanted portion 221 is integrated into the cover 2 allows for smaller clamps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

It should also be noted that elements of embodiments may be described in reference to the description of a particular embodiment; however, it is disclosed that elements of disclosed embodiments can be switched with corresponding elements of embodiments with the same name and/or number of other disclosed embodiments.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. An apparatus comprising:
    a cover comprising one or more positioners, wherein each positioner comprises a slanted portion and a landing;
    a clamping member comprising one or more outer lips; and the clamping member further defines one or more holes and one or more grooves;
    wherein the cover is coupled to the clamping member; and the one or more grooves are sized such that one of the one or more positioners can fit in the one or more grooves; the clamping member is configured to move between an attachment position and a secured position; in the attachment position a ledge is located on the landing; in the secured position, the one or more positioners extends through the one or more grooves, and the ledge is located on the slanted portion; as the clamping member moves from the attachment position to the secured position, as the cover is released, the ledge moves off the landing along the slanted portion resulting in relative lateral and vertical movement of the clamping member relative to the cover; and gravity can cause the clamping member to move from the attachment position to the secured position.

2. The apparatus of claim 1, further comprising a securing member and one or more nuts; the securing member comprises one or more threaded members coupled to the one or more nuts; and in the secured position the clamping member is sandwiched between the cover and the securing member.

3. The apparatus of claim 2, wherein each threaded member extends through the one or more holes.

4. The apparatus of claim 1, further comprising a slat wall comprising one or more vertical faces; and the one or more outer lips abut the one or more vertical faces.

5. The apparatus of claim 4, wherein the cover further comprises one or more inner lips that abut the one or more vertical faces.

6. The apparatus of claim 2, wherein the securing member is in sliding engagement with the one or more holes.

7. The apparatus of claim 1, wherein the cover further comprises a device attachment.

8. The apparatus of claim 7, wherein the device attachment comprises a post insert.

9. The apparatus of claim 8, wherein the device attachment further comprises a tightening screw that is configured to apply pressure against the post insert when actuated to do so.

10. The apparatus of claim 1, further comprising a securing member and one or more cams; the securing member comprises one or more threaded members coupled to the one or more cams; in a secured position the clamping member is sandwiched between the cover and the securing member; and the one or more cams are configured so that proper rotation of the one or more cams place the clamping member in the secured position.

11. The apparatus of claim 1, wherein the cover further comprises one or more device attachments.

12. The apparatus of claim 1, wherein the cover further comprises two or more mounting holes.

13. The apparatus of claim 12, wherein the two or more mounting holes are threaded.

14. The apparatus of claim 2, wherein the one or more nuts are weld nuts, clinch nuts or a combination of weld nuts and clinch nuts.

15. The apparatus of claim 2, wherein the one or more nuts are integral with a plate.

\* \* \* \* \*